United States Patent
Sueoka et al.

(10) Patent No.: US 7,866,487 B2
(45) Date of Patent: Jan. 11, 2011

(54) AROMATIC POLYAMIDE POROUS FILM, PROCESS FOR PRODUCING THE SAME AND SECONDARY BATTERY

(75) Inventors: Masanori Sueoka, Otsu (JP); Kenta Nishihara, Takatsuki (JP); Akimitsu Tsukuda, Otsu (JP)

(73) Assignee: Toray Industries, Inc., Tokyo (JP)

( * ) Notice: Subject to any disclaimer, the term of this patent is extended or adjusted under 35 U.S.C. 154(b) by 654 days.

(21) Appl. No.: 11/795,531

(22) PCT Filed: Nov. 29, 2005

(86) PCT No.: PCT/JP2005/021830

§ 371 (c)(1),
(2), (4) Date: Sep. 13, 2007

(87) PCT Pub. No.: WO2006/087859

PCT Pub. Date: Aug. 24, 2006

(65) Prior Publication Data

US 2008/0113177 A1    May 15, 2008

(30) Foreign Application Priority Data

Feb. 17, 2005 (JP) .............. 2005-040399

(51) Int. Cl.
*B01D 39/00* (2006.01)
*B01D 39/14* (2006.01)
*B29C 65/00* (2006.01)
*H01M 4/00* (2006.01)

(52) U.S. Cl. .............. 210/500.38; 210/500.27; 264/41; 264/650; 264/178 R; 429/128; 429/120; 428/305.7; 428/332

(58) Field of Classification Search .............. 210/538, 210/490, 500.27, 500.57, 321.75; 429/128, 429/120, 143, 248, 252; 96/4; 428/332, 428/305.7; 264/41, 628, 650, 651, 178 R
See application file for complete search history.

(56) References Cited

U.S. PATENT DOCUMENTS

| 4,623,463 | A | * | 11/1986 | Ford et al. | ............. 210/500.29 |
| 5,683,584 | A | * | 11/1997 | Wenthold et al. | ...... 210/500.23 |
| 5,834,112 | A | * | 11/1998 | Muraoka et al. | ............ 428/332 |
| 5,856,426 | A |   | 1/1999  | Takahashi et al. | |
| 5,858,426 | A | * | 1/1999  | Bienvenu | ...................... 426/96 |

(Continued)

FOREIGN PATENT DOCUMENTS

EP    1233036 A    8/2002

(Continued)

*Primary Examiner*—Ana M Fortuna
(74) *Attorney, Agent, or Firm*—Birch, Stewart, Kolasch & Birch, LLP

(57) ABSTRACT

The problem addressed by this invention is to provide an aromatic polyamide porous film excellent in the capability of being thinned and capable of easily exhibiting stable porosity properties even if it is used for a long period of time at high temperature. This invention can be achieved by an aromatic polyamide porous film that contains an aromatic polyamide as a main component and is such that when an atomic force microscope is used to measure a range of S $\mu m^2$ at least on one surface, the sectional area S(10) $\mu m^2$ obtained at a depth of 10 nm from the surface and the sectional area S(20) $\mu m^2$ obtained at a depth of 20 nm from the surface satisfy the following formulae simultaneously.

$$0.01 \leq S(10)/S \leq 0.3$$

$$5 \leq S(20)/S(10) \leq 20$$

12 Claims, 4 Drawing Sheets

U.S. PATENT DOCUMENTS

| | | | |
|---|---|---|---|
| 6,425,993 B1 * | 7/2002 | Debe et al. | 204/296 |
| 6,447,958 B1 * | 9/2002 | Shinohara et al. | 429/248 |
| 7,112,389 B1 * | 9/2006 | Arora et al. | 429/128 |
| 2004/0161598 A1 | 8/2004 | Ohno et al. | |

FOREIGN PATENT DOCUMENTS

| | | |
|---|---|---|
| JP | 9-208736 A | 8/1997 |
| JP | 2002-201304 A | 7/2002 |
| JP | 2003-40999 A | 2/2003 |
| JP | 2004-115764 A | 4/2004 |
| JP | 2004-277625 A | 10/2004 |
| WO | WO 01/19906 A1 | 3/2001 |
| WO | WO-2004/024808 A1 | 3/2004 |

* cited by examiner

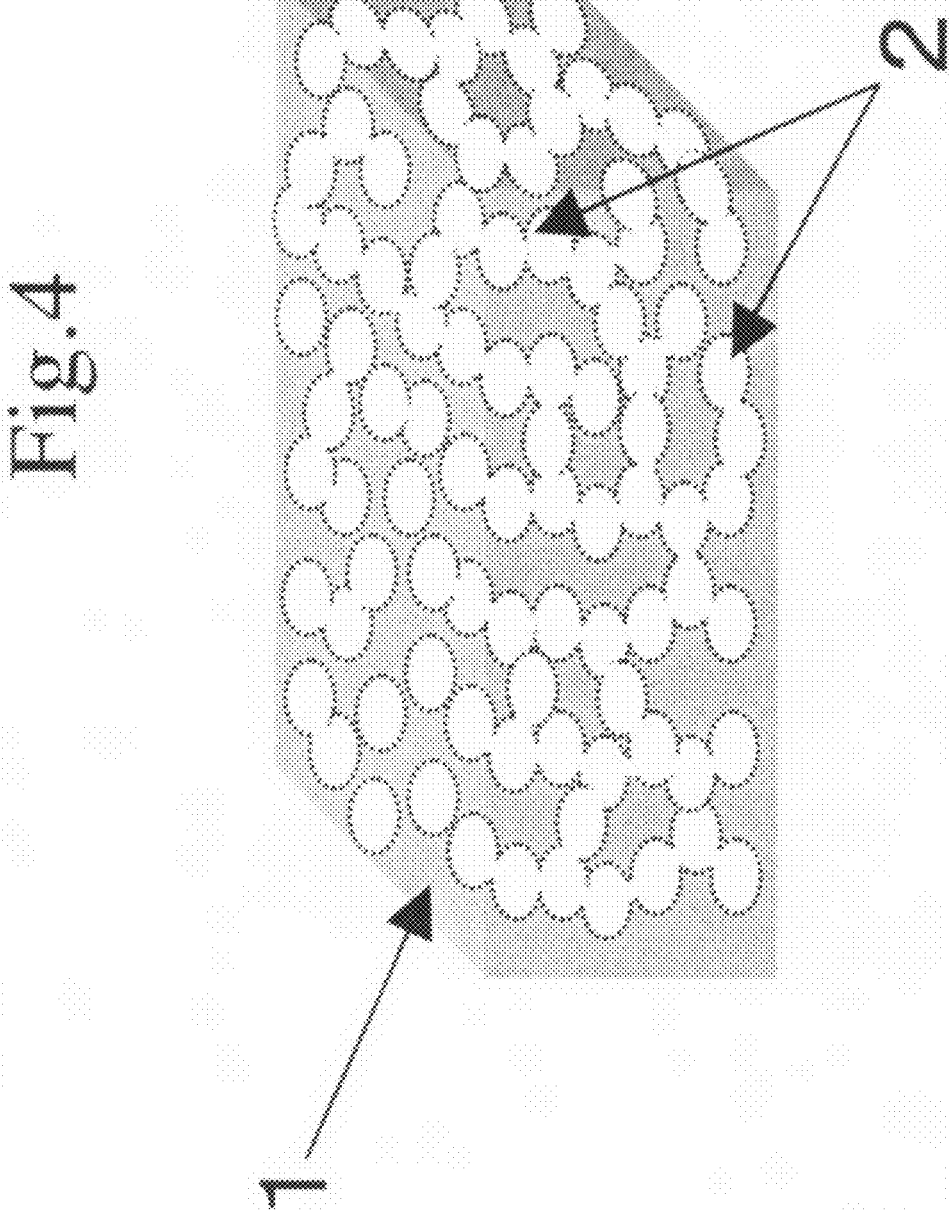

AROMATIC POLYAMIDE POROUS FILM, PROCESS FOR PRODUCING THE SAME AND SECONDARY BATTERY

TECHNICAL FIELD

The present invention relates to an aromatic polyamide porous film that can be used suitably as a filter, separation membrane, battery separator, printed board, etc.

BACKGROUND ART

Various organic electrolyte secondary batteries are known as batteries capable of achieving high capacities, high voltages and high energy densities. In each of the organic electrolyte secondary batteries (for example, lithium ion batteries), a porous polymeric film allowing ions to flow together with the electrolyte between the positive electrode and the negative electrode is installed as a separator between both the electrodes installed in opposite to each other.

In an organic electrolyte secondary battery, for example, in a lithium ion battery, unstable metals exist in the battery, and a short-circuit, ignition, etc. can be caused. Especially since molten lithium metal is highly reactive, it is necessary to break the circuit before the temperature in the battery reaches the melting point (=186° C.) of lithium for ensuring the safety. As a conventional countermeasure for it, it is widely known that a porous polyethylene film or polypropylene film with a thickness of about 25 µm having a melting point lower than that of lithium is used as a separator in the battery, in order that the separator can be melted to crush its pores for functioning as an insulator (shutdown property) before lithium is melted. For example, JP3-203160A discloses that a polyethylene film exhibits said shutdown property at a temperature lower than the melting point of lithium and proposes an explosion-proof secondary battery using said film.

However, the polyethylene film or polypropylene film used as such a separator has such problems that it is low in heat resistance, and that since there is a limit for thinning the film while ensuring the required strength, the significant enhancement of storage capacity cannot be expected considering the limited battery size. That is, if the film is merely thinned, portions locally insufficient in strength and portions insufficient in form integrity as a separator at high temperature may be formed, and such inconveniences as ignition may occur in the battery. In addition, a separator with desired ion permeability may not be able to be formed. So, the film cannot be made thinner than a certain level.

On the other hand, in recent years, as described in JP8-111238A, an electrolyte substantially free from flash point is proposed. Since the safety against ignition, etc. can be greatly enhanced if such an electrolyte is used there is a possibility that the separator can be thinned only if it can have any desired ion permeability.

Further, organic electrolyte secondary batteries are required to be further smaller in size, and organic electrolyte secondary batteries of the same size are required to be further higher in capacity and voltage, etc. So, the separators used in them are required to be further thinner.

Furthermore, in the case of separators used for the secondary batteries of hybrid electric vehicles and fuel cell vehicles, the temperatures in the engine rooms become high during running, and it is more advantageous to use the batteries at higher temperatures for obtaining higher output characteristics. So, the separators used in them are required to have further higher heat resistance.

For such an application, suitable are porous films made of aromatic polyamides (hereinafter called "aromatic polyamide porous films"), which have high stiffness, can be thinned, are substantially free from melting point, and have high heat resistance. With regard to the aromatic polyamide porous films, for example, production processes are disclosed in JP59-14494A, JP59-36939A, JP2001-98106A, U.S. Pat. No. 6,642,282, and JP2002-30176A.

Moreover, porous films are disclosed in Japanese Patent 2615976 and JP2002-293979A, and applications of aromatic polyamide porous films to battery separators are disclosed in JP11-250890A, JP2002-42767A and JP2001-43842A. That is, it is disclosed that the inventions described in Japanese Patent 2615976 and JP2002-293979 have been completed for the purpose of decreasing the change caused by temperature and humidity by controlling the expansion coefficient, that the inventions described in JP11-250890A and JP2002-42767A have been completed for the purpose of obtaining necessary ion permeability by controlling the pore size and the porosity, and that the invention described in JP2001-43842A has been completed for the purpose of improving the positive electrode oxidation resistance by forming an inorganic thin film on the surface.

However, said aromatic polyamide porous films are not satisfactory enough for such reasons that, for example, in the case where they are used for a long period of time at high temperature as in the engine rooms of hybrid electric vehicles, higher positive electrode oxidation resistance is needed, and that precipitated lithium metal clogs the pores.

DISCLOSURE OF THE INVENTION

Problem to be Solved by the Invention

The problem addressed by this invention is to provide an aromatic polyamide porous film that can allow stable battery characteristics to be maintained even in the case where the film is used as a battery separator for a long period of time at high temperature without applying special secondary treatment to the surface (for example, coating with an inorganic substance such as silicone) by strictly controlling the pore structure of the film near the surface layer and is unlikely to be deteriorated by oxidation on the surface of positive electrode side (high positive electrode oxidation resistance) in the case where the aromatic polyamide porous film is used as a battery separator.

Means for Solving the Problem

This invention for achieving the aforesaid object is characterized by an aromatic polyamide porous film that contains an aromatic polyamide and is such that when an atomic force microscope is used to measure a range of S µm$^2$ at least on one surface, the sectional area $S(10)$ µm$^2$ at a depth of 10 nm from the surface and the sectional area $S(20)$ µm$^2$ at a depth of 20 nm from the surface satisfy the following formulae simultaneously.

$$0.01 \leq S(10)/S \leq 0.3$$

$$5 \leq S(20)/S(10) \leq 20$$

EFFECT OF THE INVENTION

This invention can provide an aromatic polyamide porous film that has high stiffness, can be thinned, can enhance the capacity per battery when used as a battery separator, allows higher output owing to the heat resistance of the aromatic polyamide and the pore structure formed near the surface layer as a feature of this invention, allows stable battery characteristics to be maintained even if the film is used for a long period of time at high temperature, and is unlikely to be deteriorated by oxidation on the surface of positive electrode side (high positive electrode oxidation resistance) when used as a battery separator.

BRIEF DESCRIPTION OF THE DRAWINGS

FIG. 4 is a drawing showing a section of a further other pore structure not included in the scope of this invention.

MEANINGS OF SYMBOLS

Figure 1:
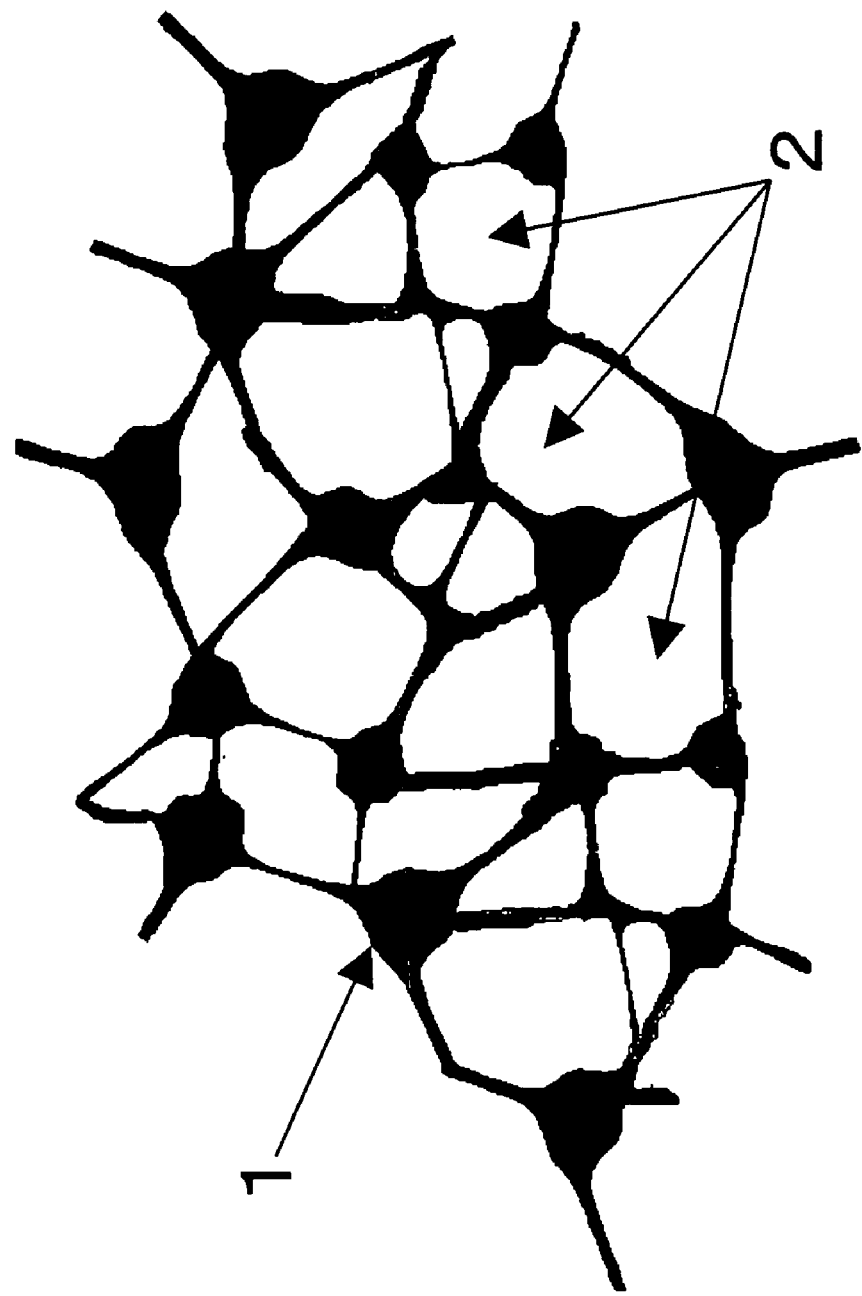
FIG. 1 is a drawing showing a section of the Open Cell structure as the characteristic structure of this invention.

1: Solid composed of an aromatic polyamide polymer
2: Pore

BEST MODES FOR CARRYING OUT THE INVENTION

It is preferred that the aromatic polyamide has repeating units, each of which is represented by the following formula (1) and/or formula (2).

Formula (1):

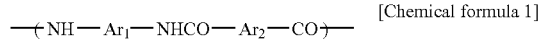

[Chemical formula 1]

Formula (2):

[Chemical formula 2]

where examples of groups $Ar_1$, $Ar_2$ and $Ar_3$ include the following:

[Chemical formulae 3]

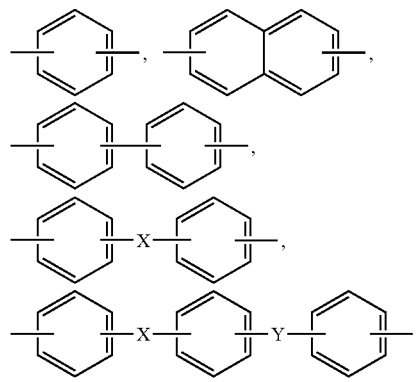

and groups X and Y can be selected from, though not limited to, —O—, —$CH_2$—, —CO—, —$CO_2$—, —S—, $SO_2$—, —$C(CH_3)_2$—, etc.

Further, it is preferred that some of the hydrogen atoms on these aromatic rings are substituted by substituents, for example, halogen groups such as fluorine, bromine and chlorine (especially chlorine), nitro groups, alkyl groups such as methyl groups, ethyl groups and propyl groups (especially methyl groups), alkoxy groups such as methoxy groups, ethoxy groups and propoxy groups, etc., since the moisture absorption coefficient can be lowered to decrease the dimensional change caused by temperature change. Furthermore, the hydrogen atoms of the amide bonds existing in the polymer can also be substituted by other substituents.

In the aromatic polyamide used in this invention, it is preferred that 80 mol % or more, more preferably 90 mol % or more of all the aromatic rings are the above-mentioned aromatic rings having para orientation. The "para orientation" in this case means the state where divalent bonds existing in the main chain of an aromatic ring are coaxial or parallel to each other. In the case where the amount of the aromatic rings having this para orientation is less than 80 mol %, the stiffness and heat resistance of the film may become insufficient. Furthermore, it is preferred that the aromatic polyamide contains 60 mol % or more of the repeating units represented by the formula (3), since the stretchability and physical properties of the film are especially excellent.

Formula (3).

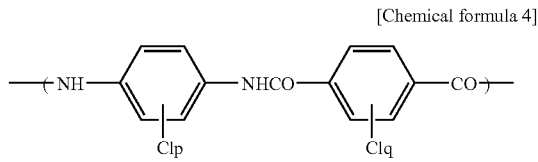

[Chemical formula 4]

(where p and q denote, respectively independently, an integer of 0 to 4)

The aromatic polyamide porous film of this invention contains an aromatic polyamide and is such that when an atomic force microscope is used to measure a range of S $\mu m^2$ least on one surface, the sectional area $S(10)$ $\mu m^2$ at a depth of 10 nm from the surface and the sectional area $S(20)$ $\mu m^2$ at a depth of 20 nm from the surface satisfy the following formulae simultaneously.

$$0.01 \leq S(10)/S \leq 0.3$$

$$5 \leq S(20)/S(10) \leq 20$$

In this case, the sectional area specified in this invention means the sum of the areas where the solid composed of the polymer exists, formed by cutting the aromatic polyamide porous film of this invention horizontally along one plane selected in the thickness direction. Therefore, $S(10)/S$ expresses the rate of the solid composed of the aromatic polyamide polymer of this invention existing at a depth of 10 nm from the surface as measured using an atomic force microscope in a range of S $\mu m^2$, and $S(20)/S(10)$ expresses the ratio of the rate $S(20)/S$ of the solid composed of the aromatic polyamide polymer of this invention existing at a depth of 20 nm from the surface as measured using an atomic force microscope in a range of S $\mu m^2$ to said $S(10)/S$.

It is preferred that $S(10)/S$ is 0.3 or less for such a reason that in the case where the porous film of this invention is used as a battery separator, with its surface turned toward the positive electrode, the contact area with the positive electrode can be decreased to inhibit that said surface of the aromatic polyamide porous film is oxidized by the active material of the positive electrode. Further, this condition is preferred for such a reason that since a moderate clearance can be formed between the positive electrode or the negative electrode and the separator, ions can easily migrate in the face direction, and that even if some pores are clogged due to precipitated lithium metal, etc., ions can migrate toward the electrode on the other side through other pores, to ensure that the ion permeability is unlikely to decline. However, if S(10)/S becomes smaller than 0.01, the strength of the film in the thickness direction is insufficient, and if the film is spirally wound together with the positive and negative electrodes for processing into a battery, it can happen that the film is compressed to increase the contact area with the positive electrode. A preferred range is $0.02 \leq S(10)/S \leq 0.2$, since both the effect of decreasing the contact area with the positive electrode and the strength in the thickness direction can be satisfactory in good balance. A more preferred range is $0.03 \leq S(10)/S \leq 0.15$.

Further, if S(20)/S(10) is smaller than 5, the strength in the face direction is not sufficient, and breaking may occur during processing. If S(20)/S(10) is larger than 20, the ion permeability may not be sufficient as the case may be. If S(20)/S(10) is 5 to 20, both the strength in the face direction and the ion permeability are satisfactory in good balance. A more preferred range is $5 \leq S(20)/S(10) \leq 15$, since both the properties can be more satisfactory, and a further more preferred range is $5 \leq S(20)/S(10) \leq 10$.

The $S(10)$ $\mu m^2$ and $S(20)$ $\mu m^2$ are measured under the following conditions using an atomic force microscope (AFM).

Instrument: NanoScope III AFM (produced by Digital Instruments)
Cantilever: Single-crystal silicon
Scanning mode: Tapping mode
Scanning range: 30 μm×30 μm
Scanning speed: 0.5 Hz
Measurement environment: 25° C., 65% relative humidity
Processing software: NanoScope III ver. 3.12

The sectional area at every 5 nm in the height direction from the reference plane was calculated, and the height at which the sectional area became 0 at first was identified as the surface. The sectional area at a depth of 10 nm from the surface was identified as $S(10)$ $\mu m^2$, and the sectional area at a depth of 20 nm from the surface was identified as $S(20)$ $\mu m^2$ for calculation.

It is preferred that the aromatic polyamide porous film of this invention has a Gurley Air Permeability of 5 to 500 sec/100 cc. In the case where the aromatic polyamide porous film of this invention has the Gurley Air Permeability kept in said range, the strength in the face direction can be maintained even if the Gurley Air Permeability is small, and the film can have a suitable porosity and a suitable pore size even if the Gurley Air Permeability is large. If the Gurley Air Permeability is smaller than 5 sec/100 cc, the strength in the face direction remarkably declines, and if the Gurley Air Permeability is larger than 500 sec/100 cc, it can happen that the ion permeability is not sufficient. It is more preferred that the Gurley value is 10 to 300 sec/100 cc, since both the strength in the face direction and the ion permeability can be satisfactory in better balance. It is further more preferred that the Gurley Air Permeability is 30 to 200 sec/100 cc.

Figure 2:
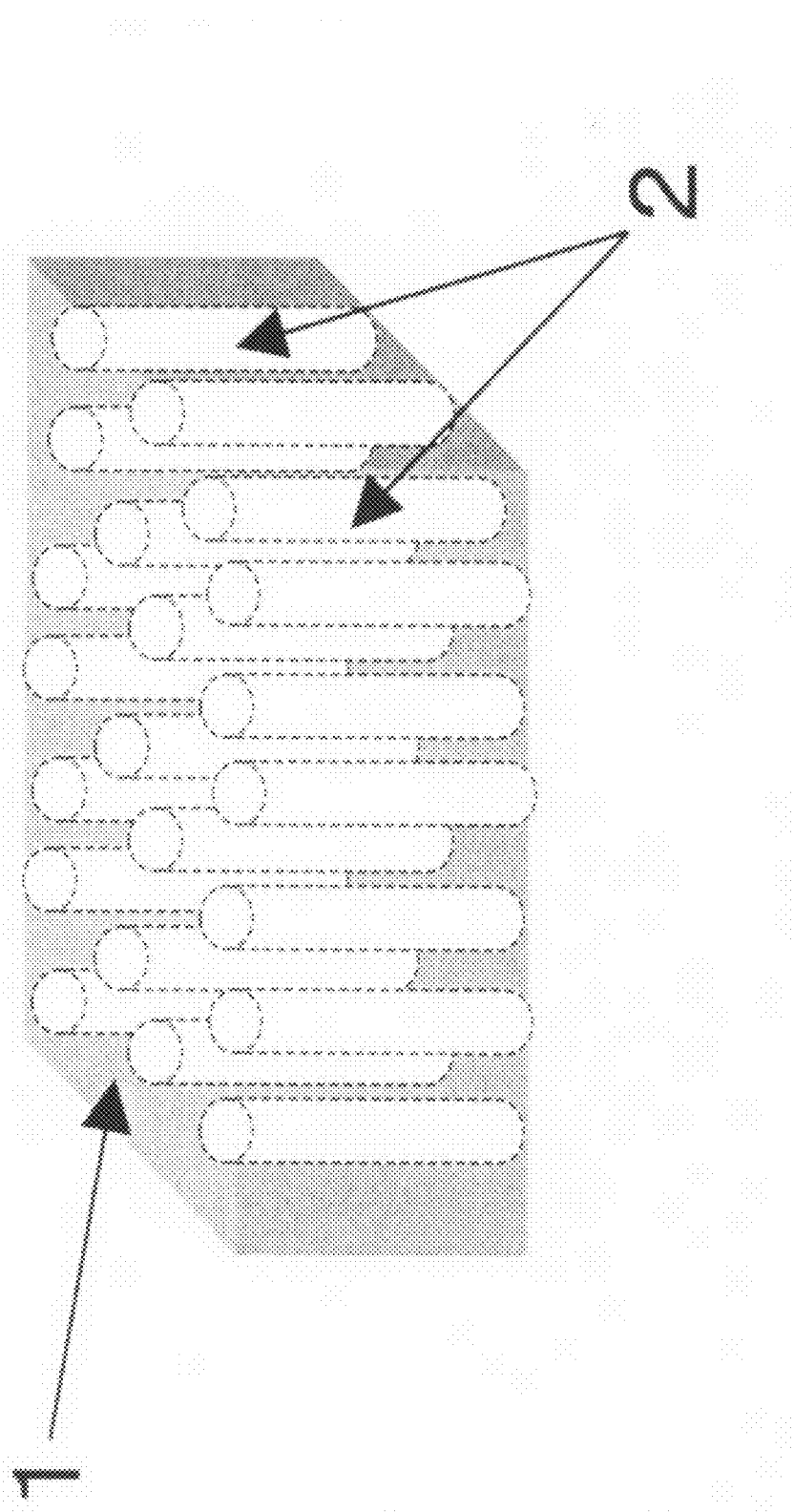
FIG. 2 is a drawing showing a section of a pore structure not included in the scope of this invention.
Figure 3:
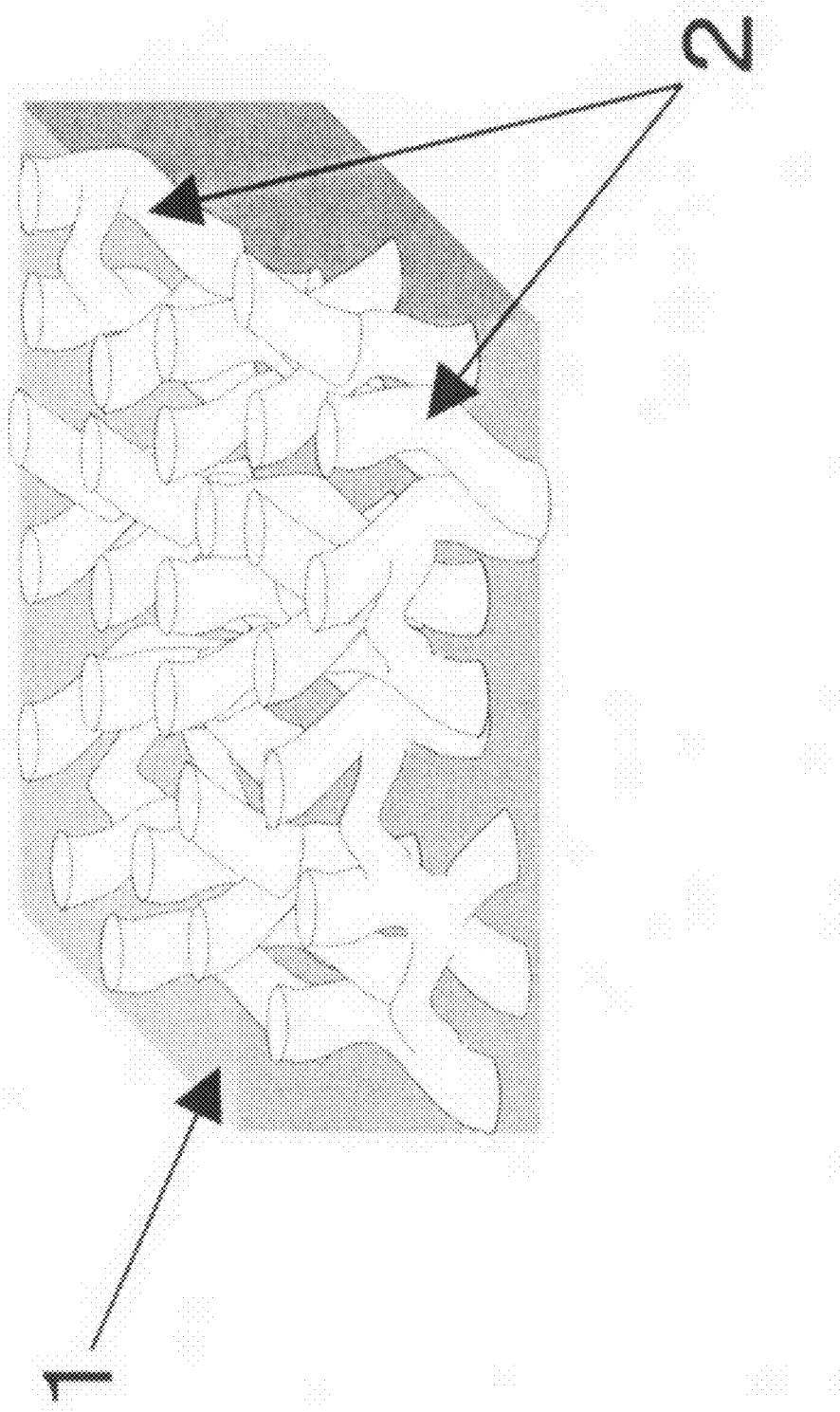
FIG. 3 is a drawing showing a section of another pore structure not included in the structure of this invention.

Further, it is preferred that the aromatic polyamide porous film of this invention has a Open Cell structure for such reasons that the ion conductivity is good and that even in the case where lithium metal is precipitated, a short-circuit between the positive electrode and the negative electrode is unlikely to occur, since the connection routes between the positive electrode and the negative electrode are long and complicated. The Open Cell structure of this invention refers to a structure in which the solid (fibrous material) composed of the aromatic polyamide polymer constituting the porous film is connected through three- or more-forked intersections to form a three-dimensionally spreading network, for example as shown in FIG. 1. Said three-dimensional network structure has pores partitioned by the solid composed of the aromatic polyamide polymer forming the network. On the other hand, an aromatic polyamide porous film having straight holes (see FIG. 2) and an aromatic polyamide porous film having a structure in which through holes are formed by bending or branching straight holes (see FIG. 3) are not preferred, since a short-circuit is likely to be formed when lithium metal is precipitated, and an aromatic polyamide porous film having a structure in which spherical or disc-like pores are connected with each other through thin routes (see FIG. 4) is not preferred, since the ion conductivity is low. These aromatic polyamide porous films cannot satisfy $0.01 \leq S(10)/S \leq 0.3$ or $5 \leq S(20)/S(10) \leq 20$.

It is preferred that the aromatic polyamide porous film of this invention has a heat shrinkage rate of 2% or less at 200° C. at least in one direction. If the heat shrinkage rate is more than 2%, it can happen that the separator used at high temperature shrinks to cause a short-circuit or to crush the pores, for lowering the ion conductivity. Meanwhile, the lower limit is 0%. It is more preferred that the heat shrinkage rate at 200° C. is 1.5% or less, since the heat resistance can be higher. Further more preferred is 1% or less.

It is preferred that the aromatic polyamide film of this invention has a Young's modulus of 3 GPa or more at least in one direction and has an elongation of 5% or more. If the Young's modulus and the elongation are high, the film can resist the high tension and tension variation imposed during processing and assures good productivity. To satisfy these properties, it is effective that in the aromatic polyamide used in this invention, preferably 80 mol % or more, more preferably 90 mol % or more of all the aromatic rings are the aromatic rings having para orientation, as described before (better productivity can be assured). It is more preferred that the Young's modulus at least in one direction is 4.5 GPa or more and that the elongation is 10% or more. In view of the general properties of aromatic polyamides, the upper limit of the Young's modulus is about 15 GPa and the upper limit of the elongation is about 60%.

It is preferred that the aromatic polyamide porous film of this invention has a thickness of 2 to 20 μm. If the thickness is more than 20 μm, the capacity per battery may not be insufficient, and if the thickness is less than 2 μm, the strength may be insufficient.

Next, the method for producing the aromatic polyamide porous film of this invention is explained below, though the method is not limited to or by the explanation.

At first, with regard to the aromatic polyamide, for example, in the case where the aromatic polyamide is obtained from an acid chloride and a diamine, it is possible to employ a method of synthesizing by solution polymerization in an aprotic organic polar solvent such as N-methylpyrrolidone, dimethylacetamide or dimethylformamide, or a method of synthesizing by interfacial polymerization, etc. of polymerizing at the interface between a water layer and an organic solvent layer of carbon tetrachloride or hexane, etc. If an acid chloride and a diamine are used as monomers, hydrogen chloride is produced as a byproduct in the polymer solution, and to neutralize it, it is desirable to use an inorganic neutralizer such as calcium hydroxide, calcium carbonate or lithium carbonate or an organic neutralizer such as ethylene oxide, propylene oxide, ammonia, triethylamine, triethanolamine or diethanolamine. Further, in the case where the aromatic polyamide is obtained by the reaction between an isocyanate and a carboxylic acid, it can be synthesized in the presence of a catalyst such as pyridine or triethylamine in any of said aprotic organic polar solvents.

For obtaining the porous film of this invention, it is preferred that the intrinsic viscosity ηinh (the value of 100 ml of the solution obtained by dissolving 0.5 g of the polymer into 98 wt % sulfuric acid and measured at 30° C.) of the polymer synthesized as described above is 0.5 (dl/g) or more, since the porous film obtained can have a high elongation and is good in handling convenience.

An inorganic salt such as calcium chloride, magnesium chloride, lithium chloride or lithium nitrate may be added as a dissolving aid to the film forming solution consisting of the aromatic polyamide interfacially polymerized at the interface with said organic solvent layer and said organic solvent, or to the film forming solution consisting of the aromatic polyamide synthesized in said aprotic organic polar solvent and said organic polar solvent. A poor solvent for said polymer, typified by water, acetone or an alcohol such as methanol or ethanol can be added, or a water soluble polymer typified by polyvinyl alcohol, polyvinyl pyrrolidone or polyethylene glycol can be added to the neutralized polymer (aromatic polyamide) solution to be used as the film forming solution, for the purpose of adjusting the solubility of the polymer. Meanwhile, the poor solvent for the polymer in this case means such a solvent that 1 g or more of the polymer cannot be dissolved in 100 ml of the solvent at 25° C.

Further, a solution obtained by re-dissolving an isolated polymer into said aprotic organic polar solvent and mixing said poor solvent and water soluble polymer can also be used as the film forming solution. It is preferred that the polymer concentration of the film forming solution is about 2 to about 30 wt %. A preferred range 2 to 30 wt %, since a thin and stable porous film can be efficiently obtained. A more preferred range is 8 to 25 wt %, and a further more preferred range is 12 to 20 wt %. Furthermore, for quickly precipitating the polymer, it is preferred that the amount of the poor solvent and water soluble polymer to be mixed is 2 to 40 wt %. A more preferred range is 5 to 30 wt %, and a further more preferred range is 10 to 25 wt %.

The film forming solution prepared as described above is formed into a porous film by a so-called solution film formation process. Solution film formation processes include a dry-wet process, wet process, precipitation process, etc., and any one of the processes can be used for forming the film. However, a precipitation process is more preferred, since a porous film with a homogeneous internal structure can be obtained.

In the case where the porous film is produced by a precipitation process, the film forming solution is cast onto a support such as a glass sheet, film, drum or endless belt, to form a coating. Then, a method of cooling it or letting it absorb water is used for lowering the solubility of the polymer, to thereby precipitate it. In this case, the method of cooling the coating formed from the film forming solution is more preferred, since the precipitation rate can be easily controlled.

In the method of cooling the coating formed from the film forming solution, the temperature of the support and the temperature of the atmosphere around the support onto which the film forming solution is cast are kept at −30 to 0° C. If the temperatures are lower than −30° C., it can happen that S(10) and S(20) do not satisfy the ranges of this invention because of the suddenly occurring precipitation and that the entire system is frozen not allowing through holes to be formed. It is more preferred that the temperature of the support and the temperature of the atmosphere around the support onto which the film forming solution is cast are −20 to −5° C., since the pore structure of this invention can be formed in a shorter period of time. Further, it is preferred that the difference between the temperature of the support and the temperature of the atmosphere around the support onto which the film forming solution is cast is kept within 15° C. in absolute value, since the difference of physical properties between the front and rear surfaces of the film can be kept small.

It is preferred that the film forming solution cooling time is 1 to 20 minutes. The film forming solution cooling time in this case means the period of time from immediately after casting the film forming solution till the introduction into the wet bath. If the time is less than 1 minute, the pore formation is insufficient and the Gurley Air Permeability becomes large. That is, the ion permeability can be lowered. If the time is longer than 20 minutes, the pores become so large that the film becomes fragile and may not be able to withstand practical use.

Moreover, it is preferred that the polymer solution is once cooled to a range from −15 to 15° C. by the die, piping, etc. before the film forming solution is cast onto the support, so that the difference from the temperature of the support and from the temperature of the atmosphere around the support onto which the film forming solution is cast is kept at 15° C. or less in absolute value. In the case where cooling is performed with the temperature difference kept at more than 15° C. in absolute value, S(10) and S(20) may not satisfy the ranges of this invention.

In the method in which the coating formed from the film forming solution is made to absorb water, any of the method of depositing water like mist, the method of introducing into water or the method of introducing into humidified air can be used. However, the method of introducing into humidified air can be suitably used, since the water absorption rate and quantity can be finely controlled. In the case where the polymer solution formed as a coating is introduced into humidified air, it is preferred to precipitate the polymer contained in the film forming solution by the air humidified to have a relative humidity of 50 to 100%. The suitable temperature of the humidified air in this case is 0 to 80° C.

The solution in which the polymer precipitation has been completed is then introduced into a wet bath, for removing the solvent. In this case, the solution separated from the support can be introduced into the wet bath or after the solution is introduced into the wet bath together with the support, it can be separated. The bath composition is not especially limited if the bath is low in aromatic polyamide solubility, but it is preferred to use water or a mixture consisting of an organic solvent such as N-methylpyrrolidone or dimethylacetamide and water in view of economy and easy handling. Further, the wet bath can also contain an inorganic salt such as lithium chloride, lithium bromide or calcium carbonate. If a method of cooling after forming a coating from the film forming solution is employed in this case, it is preferred that the difference (Ta−Tb) between the temperature of the wet bath (Ta) and the temperature of the coating before introduction into the wet bath (Tb) is 0 to 10° C. If the difference is less than 0° C., the solvent removing rate may decline and the productivity may decline considerably. If the difference is more than 10° C., it can happen that S(10) and S(20) do not satisfy the ranges of this invention. Especially in the case where cooling to a low temperature of lower than −10° C. is performed, it is preferred that the coating temperature is once raised to 0° C. before the coating is introduced into the wet bath. Meanwhile, in the case where the coating temperature is once raised to 0° C. before the coating is introduced in the wet bath, the cooling time of the film forming solution in this invention means the time from immediately after the film forming solution is cast till the coating temperature becomes 0° C.

The porous film from which the solvent is removed is heat-treated. It is preferred that the heat treatment temperature in this case is higher, since the dimensional stability at high temperature can be improved, but it is necessary that the temperature is lower than the thermal decomposition temperature of the polymer used. Since the aromatic polyamide is thermally decomposed at 350 to 400° C., the heat treatment is performed at a temperature lower than the range, and it is preferred that the heat treatment temperature is 250 to 320° C. In this case, stretching can also be performed. It is preferred that the stretching ratio is 1.0 to 4.0 times as the area ratio from the viewpoint of controlling the Young's modulus and the elongation in the preferred ranges of this invention. It is more preferred that the stretching ratio is 1.0 to 1.1 times to such an extent that the film does not shrink during heat treatment, since the elongation can be further improved.

The aromatic polyamide porous film of this invention can be suitably used as a filter, separation membrane, battery separator, printed board, etc. Above all, it is preferred to use the film as a battery separator for forming a secondary battery, especially a lithium ion secondary battery.

It is preferred that the lithium ion secondary battery uses a carbon material typified by graphite or amorphous hard carbon, etc. as the negative electrode, a transition metal oxide lithium compound typified by lithium cobalt oxide (composition formula $LiCoO_2$) of layered structure or manganese oxide (composition formula $LiMn_2O_4$) of spinel structure as the positive electrode, and an organic solvent or said organic solvent and a lithium salt, especially a mixture obtained by mixing trimethyl phosphate, triethyl phosphate, or tripropyl phosphate, etc. with conventionally generally used ethylene carbonate or propylene carbonate as the electrolyte. If the aromatic polyamide porous film of this invention is used as a battery separator interposed between the positive electrode and the negative electrode, the short-circuit caused by the contact between the active materials of both the electrodes can be prevented and the electrolyte can be held to assure good conductivity.

Further, even if the lithium ion secondary battery is installed in the engine room of a motor vehicle such as a hybrid vehicle or fuel cell vehicle, which reaches a high temperature during running, high positive electrode oxidation resistance and high output characteristics can be sufficiently exhibited.

EXAMPLES

Methods for Measuring Physical Properties and Methods of Evaluating Effects

The methods for measuring physical properties and methods for evaluating effects in the examples were as follows.

(1) $S(10)$ μm$^2$ and $S(20)$ μm$^2$

These were measured under the following conditions using an atomic force microscope (AFM). Five places were selected for measurement at 10 cm intervals in the machine direction (film forming direction) of the film at the central portion in the transverse direction, and the mean value was calculated. The sectional area at every 5 nm in the height direction from the reference plane was calculated, and the height at which the sectional area became 0 at first was identified as the surface. The sectional area obtained at a depth of 10 nm from the surface was identified as $S(10)$ μm$^2$, and the sectional area obtained at a depth of 20 nm from the surface was identified as $S(20)$ μm$^2$ for calculation.

Instrument: NanoScope III AFM (produced by Digital Instruments)
Cantilever: Single-crystal silicon
Scanning mode: Tapping mode
Scanning range: 30 μm×30 μm
Scanning speed: 0.5 Hz
Measurement environment: 25° C., 65% relative humidity
Processing software: NanoScope III ver. 3.12

(2) Open Cell Structure

Ultra high resolution field emission scanning electron microscope (SEM) S-900H produced by Hitachi, Ltd. was used to observe a central place on the surface of the porous film and also the top, bottom, right and left places located at a distance of 5 cm apart from the central place, namely, five places in total for confirmation under the following conditions.

Accelerating voltage: 5 kV
Observation magnification: 30,000×

(3) Gurley Air Permeability

According to the method specified in JIS P8117 (1998), Gurley Air Permeability were measured at a central place in the transverse direction of the porous film and also the top, bottom, right and left places located at a distance of 5 cm apart from the central place, namely, five places in total, and the mean value was obtained. The sample porous film was clamped to a circular hole with a diameter of 28.6 cm and an area of 645 mm$^2$. An inner cylinder (inner cylinder weight 567 g) was used to pass the air in the cylinder to outside the cylinder through the test circular hole portion. The time during which 100 cc of air was passed through was measured as the Gurley Air Permeability. As the measuring instrument, B-type Gurley Densometer (Yasuda Seiki Seisakusho, Ltd.) was used.

(4) Heat Shrinkage Rate

Strips of 1 cm in width and 22 cm in length were obtained from the porous film by cutting in such a manner that the long side agreed with the measuring direction. The 1 cm portions from both the ends of the long side were marked, and the strip was heat-treated in a hot air oven of 200° C. for 30 minutes substantially in a tension-less state, and the distance between the marks was measured. The heat shrinkage rate was calculated from the following formula. Measurement was performed in the machine direction and in the transverse direction of the film five times each, and the mean values were obtained.

Heat shrinkage rate (%)={(Distance before heat treatment−Distance after heat treatment and cooling)/Distance before heat treatment}×100

(5) Young's Modulus and Elongation

The Young's modulus and the elongation were measured using Robot Tensilon RTA (produced by Orientec Co., Ltd.) at 23° C. and 65% relative humidity. Strips of 10 mm in width and 100 mm in length were prepared as specimens by cutting in such a manner that the long side agreed with the measuring direction. The stress rate was 300 mm/min. Measurement was performed in the machine direction and the transverse direction of the film five times each, and the mean values were obtained.

(6) Thickness

An electronic micrometer (detector type K107C, stylus radius 1.5 mm, stylus load 1.5 g) produced by Kansai Anritsu Electronics Co., Ltd. was used to measure at a central place in the transverse direction and also at the top, bottom, right and left places located at a distance of 50 mm apart from the central place, namely, at five places in total, and the mean value was obtained.

(7) Battery Characteristics

A. Preparation of Electrolyte $LiC_4F_9SO_3$ was dissolved into trimethyl phosphate, and propylene carbonate was added and mixed to prepare an organic electrolyte in which 0.6 mole/liter of $LiC_4F_9SO_3$ was dissolved in a mixed solvent consisting of propylene carbonate and trimethyl phosphate mixed at a ratio by volume of 1:2. To examine the flash point of the organic electrolyte obtained like this, the electrolyte was heated to predetermined temperatures, and fire was brought closer to the liquid surface, to test whether ignition occurred. In a test of 100° C., 150° C. and 200° C., ignition did not occur. So, the flash point of the electrolyte was found to be higher than 200° C.

B. Preparation of Batteries

Graphite and polyvinylidene fluoride were added to lithium cobalt oxide ($LiCoO_2$), and the mixture was dispersed into a solvent, to obtain a slurry. It was uniformly applied to both the surfaces of a 10 μm thick aluminum foil used as a positive electrode current collector and dried, and the coated aluminum foil was compression-molded, to prepare a band-like positive electrode. The thickness of the positive electrode was 40 μm.

Coke and polyvinylidene fluoride as an adhesive was mixed to make the active material of a negative electrode, and it was dispersed into a solvent, to make a slurry. The negative electrode active material slurry as a negative electrode current collector was uniformly applied to both the surfaces of a 10 μm thick band-like copper foil and dried, and the coated foil was compression-molded to prepare a band-like negative electrode precursor. To prepare the treatment liquid of the negative electrode precursor, $LiC_4F_9SO_3$ was dissolved into trimethyl phosphate, and ethylene carbonate was added and mixed for preparing the treatment liquid. The negative electrode precursor was held between lithium foils respectively having a lead wire pressure-bonded, wherein a separator impregnated with the treatment liquid was interposed between the negative electrode precursor and each of the lithium foils. The assembly was placed in a holder, and with the negative electrode precursor as the positive electrode and the lithium electrode as the negative electrode, discharge and charge were performed. Then, the holder was dismantled, and the negative electrode precursor was washed with dimethyl carbonate and dried, to prepare a negative electrode. The thickness of the negative electrode was 50 μm.

Then, said band-like positive electrode and said foil-like negative electrode were overlaid through the separator film of each example, and they were spirally wound to make a spiral electrode assembly. It was packed into a bottomed cylindrical battery case with an inner diameter of 13 mm, and the lead wires of the positive electrode and the negative electrode were welded. Subsequently, the organic electrolyte was injected into the battery case. The opening of the battery case was sealed, and the battery was preliminarily charged, to prepare a cylindrical organic electrolyte secondary battery. Ten secondary batteries, each as described above, were prepared and evaluated as follows.

C. Battery Characteristics

Each of the prepared secondary batteries was charged up to 4.1 V at 35 mA in an atmosphere of 150° C. and discharged down to 2.7 V, and the discharge capacity of $1^{st}$ cycle and that of $100^{th}$ cycle were examined.

For (1) and (2), the mean values of ten secondary batteries were obtained. Further, for (2), the batteries that burst or fired during the charge and discharge operation were removed from the calculation.

(1) Initial Characteristic

Discharge capacity (mA·h/g) of $1^{st}$ cycle (2) Cycle Characteristic

The discharge capacity of $100^{th}$ cycle was evaluated in reference to the discharge capacity of $1^{st}$ cycle according to the following criterion. B or higher is a practical range.

A: 95% or more

B: 90% to less than 95%

C: Less than 90%

(3) Number of Defective Batteries

The number of batteries that burst or fired during the charge and discharge operation of 100 cycles was counted.

This invention is described below more particularly based on examples, but is not limited thereto or thereby needless to say.

Example 1

Eighty mole percent, based on the total amount of diamines, of 2-chloroparaphenylenediamine and 20 mol %, based on the total amount of diamines, of 4,4'-diaminodiphenyl ether were dissolved into dehydrated N-methyl-2-pyrrolidone, and 98.5 mol %, based on the total amount of diamines, of 2-chloroterephthalic acid chloride was added to the solution. The mixture was stirred for 2 hours for polymerization, and the reaction solution was neutralized by lithium carbonate, to obtain an aromatic polyamide solution with a polymer concentration of 11 wt %. The solution was introduced into a mixer together with water, and with stirring, the polymer was precipitated and taken out.

Ten weight percent of the polymer, 70 wt % of N-methyl-2-pyrrolidone and 20 wt % of polyethylene glycol (average molecular weight 200) were weighed. At 60° C., the polymer was dissolved into N-methyl-2-pyrrolidone, and polyethylene glycol was added to obtain a homogeneously perfectly compatible polymer solution.

The polymer solution was fed into a die and cast as an about 100 μm coating onto a stainless steel belt. The die and the piping up to the die were set at 5° C., and the belt and the atmosphere around the belt were set at −5° C. The cast polymer solution was cooled on the belt for 5 minutes for precipitation, to obtain a porous film. The porous film was separated from the belt and immersed in a water tank of 5° C. for 2 minutes and then in a water tank of 50° C. for 1 minute, to extract the solvent and impurities. Then, in a tenter, it was stretched to 1.1 times in the transverse direction, while it was heat-treated at 320° C. for 2 minutes, to obtain an aromatic polyamide porous film.

Main production conditions are shown in Table 1, and the physical properties of the obtained porous film are shown in Table 2. The initial capacity, cycle characteristic and fraction defective were good. Further, by observation with SEM, it was confirmed that a Open Cell structure was formed.

Example 2

A porous film was obtained using the polymer solution obtained as described for Example 1 according to the same

Example 3

A porous film was obtained using the polymer solution obtained as described for Example 1 according to the same method as that of Example 1, except that the temperature of the belt and the temperature of the atmosphere around the belt were set at 0° C. The initial capacity and cycle characteristic were lower than those of Example, but were in practical ranges.

Example 4

A porous film was obtained using the precipitated polymer obtained as described for Example 1 according the same method as that of Example 1, except that a film forming solution consisting of 10 wt % of the polymer and 90 wt % of N-methyl-2-pyrrolidone (without containing polyethylene glycol) was prepared, that the temperature of the belt and the temperature of the atmosphere around the belt were set at −10° C., and that the cooling time was 10 minutes. The initial capacity and cycle characteristic were lower than those of Example 1 but were in practical ranges.

Example 5

A porous film was obtained according to the same method as that of Example 1, except that the added amounts of monomers were 50 mol %, based on the total amount of diamines, of 2-chloroparaphenylenediamine and 50 mol %, based on the total amount of diamines, of 4,4'-diaminodiphenyl ether. The Young's modulus was low and the packing rate declined and the initial capacity was lower than that of Example 1. However, they were in practical ranges. The cycle characteristic was also lower than that of Example 1 but was in a practical range.

Example 6

A porous film was obtained using the precipitated polymer obtained as described for Example 1 according to the same method as that of Example 1, except that a film forming solution consisting of 10 wt % of the polymer, 80 wt % of N-methyl-2-pyrrolidone and 10 wt % of polyethylene glycol (average molecular weight 200) was prepared, that a 100 μm thick PET film was used as the support, that the thickness of the cast coating was 25 μm, that the die and the piping up to the die were set at −15° C., that the temperature of the PET film and the temperature of the atmosphere around the PET film were set at −30° C., and that the cooling time was 20 minutes. However, the cooled polymer solution was once heated to 0° C. and introduced into the water tank. The initial capacity, cycle characteristic and fraction defective were excellent.

Example 7

A porous film was obtained according to the same method as that of Example 1, except that the thickness of the cast coating was 8 μm. While the initial capacity became large, the number of defective batteries increased but was in a practical range.

Example 8

A porous film was obtained according to the same method as that of Example 1, except that the thickness of the cast coating was 200 μm. The initial capacity became small, and the cycle characteristic was also lower than that of Example 1. However, they were in practical ranges.

Example 9

The film forming solution of Example 1 was cast on a 100 μm thick PET film, to have a thickness of 150 μm, and treated in an atmosphere of 15° C. and 90% RH for 30 minutes. Then, the coating was introduced into a water tank and thereafter processed according to the same method as that of Example 1, to obtain a porous film. The number of defective batteries increased but was in a practical range.

Example 10

The film forming solution of Example 1 was cast onto a 100 μm thick PET film, to have a thickness of 120 μm, and the coating was introduced into a bath of NMP/water=80/20 vol % of 5° C. together with the PET film. The coating was introduced into a water tank and thereafter processed according to the same method as that of Example 1, to obtain a porous film. The cycle characteristic declined and the number of defective batteries increased. However, they were in practical ranges.

Comparative Example 1

A porous film was obtained according to the same method as that of Example 1, except that the cooling time was 0.5 minute. The initial capacity and the cycle characteristic were poor.

Comparative Example 2

A porous film was obtained according to the same method as that of Example 1, except that the die temperature was 10° C. and the temperature of the belt and the temperature of the atmosphere around the belt were set at −10° C. The initial capacity and the cycle characteristic were poor.

Comparative Example 3

A porous film was obtained according to the same method as that of Example 1, except that the temperature of the die was set at 10° C., that the temperature of the belt and the temperature of the atmosphere around the belt were set at −10° C., and that the temperature of the water tank was set at 10° C. The initial capacity and the cycle characteristic were poor.

Comparative Example 4

A porous film was obtained according to the same method as that of Example 1, except that the cooling time was 30 minutes. The cycle characteristic and the fraction defective were poor.

Comparative Example 5

A porous film was obtained according to the same method as that of Example 1, except that the temperature of the die was set at 5° C. and that the temperature of the belt and the temperature of the atmosphere around the belt were set at −40° C. Since the Gurley Air Permeability was large (the ion conductivity was low), the battery characteristics could not be evaluated.

Comparative Example 6

The polymer solution obtained as described for Example 1 was cast onto a 100 μm thick PET film, to have a thickness of 100 μm, and the coating was introduced into a water tank of 5° C. for 5 minutes together with the PET film and then into a water tank of 50° C. for 1 minute, for extracting the solvent and impurities. Subsequently in a tenter, it was stretched to 1.1 times in the transverse direction while it was heat-treated at 320° C. for 2 minutes in an attempt to obtain an aromatic polyamide porous film. Under observation with SEM, it was found that no pores were formed at all. So, the battery characteristics could not be evaluated.

Comparative Example 7

The precipitated polymer obtained as described for Example 1 was used to prepare a film forming solution consisting of 10 wt % of the polymer and 90 wt % of N-methyl-2-pyrrolidone (without containing polyethylene glycol). The solution was cast onto an endless belt, to have a thickness of about 130 μm and heated by hot air of 180° C. for 2 minutes, to evaporate the solvent, and the self-supporting film was continuously separated from the belt. Then, it was introduced into a water tank of 50° C., to extract with water, the remaining solvent and the inorganic salt produced by neutralization. Subsequently it was at first preliminarily dried in a tenter at 80° C. for 30 minutes, and stretched to 1.1 times in the transverse direction while it was heat-treated at 280° C. for 1.5 minutes, to obtain a 12 μm thick aromatic polyamide film.

The film was passed between an iron roll electrodeposited on the surface with numerous synthetic diamond particles having sharp angles with a particle size of 50 to 60 μm and a silicone rubber roll under pressurization, to obtain an aromatic polyamide film.

Under observation with SEM, it was found that straight holes were formed. The cycle characteristic was poor.

Comparative Example 8

The precipitated polymer obtained as described for Example 1 was used to prepare a film forming solution consisting of 10 wt % of the polymer and 90 wt % of N-methyl-2-pyrrolidone (without containing polyethylene glycol). Two weight percent, based on the weight of the polymer, of a surfactant ("Homogenol" L-18 produced by Kao Corp.) and 80 wt % of fine zinc oxide particles with an average particle size of 1 μm (specific gravity 5.47, produced by Kojundo Chemical Lab.) were homogeneously dispersed and mixed with the solution with heating at 60° C. in a nitrogen stream. Thereafter, as described for Comparative Example 7, a 12 μm thick aromatic polyamide film was obtained.

The film was immersed in 5% nitric acid aqueous solution for 30 minutes, to dissolve and remove the fine zinc oxide particles dispersed in the white film. Then, after washing in a water tank of 40° C., the film was dried at 100° C. for 1 minute, to obtain an aromatic polyamide porous film. The cycle characteristic and the fraction defective were poor.

TABLE 1

| | Polymer composition | Additive, added amount (wt %) | Thickness of cast coating (μm) | Die | Support | Temperature (° C.) Atmosphere | Water tank | Cooling time (min) |
|---|---|---|---|---|---|---|---|---|
| Example 1 | 1 | PEG, 20 | 100 | 5 | −5 | −5 | 5 | 5 |
| Example 2 | 1 | PEG, 20 | 50 | 5 | −5 | −5 | 5 | 20 |
| Example 3 | 1 | PEG, 20 | 100 | 5 | 0 | 0 | 5 | 5 |
| Example 4 | 1 | Nil | 100 | 5 | −10 | −10 | 5 | 10 |
| Example 5 | 2 | PEG, 20 | 100 | 5 | −5 | −5 | 5 | 5 |
| Example 6 | 1 | PEG, 10 | 25 | −15 | −30 | −30 | 5 | 20 |
| Example 7 | 1 | PEG, 20 | 8 | 5 | −5 | −5 | 5 | 5 |
| Example 8 | 1 | PEG, 20 | 200 | 5 | −5 | −5 | 5 | 5 |
| Example 9 | 1 | PEG, 20 | 150 | At 15° C. and 90% RH for 30 min | | | | |
| Example 10 | 1 | PEG, 20 | 120 | NMP/water = 80/20 vol % bath of 5° C. for 5 min | | | | |
| Comparative Example 1 | 1 | PEG, 20 | 100 | 5 | −5 | −5 | 5 | 0.5 |
| Comparative Example 2 | 1 | PEG, 20 | 100 | 10 | −10 | −10 | 5 | 5 |
| Comparative Example 3 | 1 | PEG, 20 | 100 | 10 | −10 | −10 | 10 | 5 |
| Comparative Example 4 | 1 | PEG, 20 | 100 | 5 | −5 | −5 | 5 | 30 |
| Comparative Example 5 | 1 | PEG, 20 | 100 | 5 | −40 | −40 | 5 | 5 |
| Comparative Example 6 | 1 | PEG, 20 | 100 | Water tank of 5° C. for 5 minutes | | | | |
| Comparative Example 7 | 1 | Nil | 130 | Synthetic diamond particles | | | | |
| Comparative Example 8 | 1 | Zinc oxide | 130 | Dissolved and removed by 5% nitric acid aqueous solution | | | | |

Polymer composition 1: 2-chloroparaphenylenediamine/4,4'-diaminodiphenyl ether/2-chloroterephthalic acid chloride = 80/20/98.5 mol %
Polymer composition 2: 2-chloroparaphenylenediamine/4,4'-diaminodiphenyl ether/2-chloroterephthalic acid chloride = 50/50/98.5 mol %
Note:
Example 6: After the polymer solution was cooled, it was once heated to 0° C. before it was introduced into the water tank.

TABLE 2

| | Thickness (μm) | Three-dimensional network structure | S(10)/S | S(20)/ S(10) | Gurley value (sec) | Heat shrinkage rate (%) MD | Heat shrinkage rate (%) TD | Young's modulus (GPa) MD | Young's modulus (GPa) TD | Elongation (%) MD | Elongation (%) TD | Initial capacity (mAh/g) | Cycle characteristic | Number of defective batteries |
|---|---|---|---|---|---|---|---|---|---|---|---|---|---|---|
| Example 1 | 19 | Yes | 0.01 | 10 | 50 | 0.2 | 0.2 | 4.7 | 4.6 | 10 | 12 | 180 | A (96%) | 0 |
| Example 2 | 16 | Yes | 0.02 | 5 | 3 | 1.8 | 1.7 | 3.2 | 3.4 | 5 | 4 | 210 | A (98%) | 1 |
| Example 3 | 12 | Yes | 0.03 | 16 | 450 | 0.5 | 0.6 | 5.7 | 5.7 | 15 | 13 | 120 | A (96%) | 0 |
| Example 4 | 12 | Yes | 0.03 | 18 | 520 | 0.7 | 0.7 | 7.2 | 7.5 | 22 | 25 | 100 | B (93%) | 0 |
| Example 5 | 18 | Yes | 0.02 | 12 | 120 | 2.2 | 2 | 2.8 | 2.6 | 24 | 19 | 110 | B (91%) | 1 |
| Example 6 | 3 | Yes | 0.15 | 5 | 280 | 0.5 | 0.5 | 6.8 | 6.6 | 12 | 15 | 250 | A (96%) | 0 |
| Example 7 | 1 | Yes | 0.08 | 8 | 4 | 0.4 | 0.4 | 4.5 | 4.6 | 3 | 4 | 260 | A (96%) | 3 |
| Example 8 | 22 | Yes | 0.12 | 6 | 360 | 0.2 | 0.2 | 6.8 | 7.1 | 20 | 14 | 90 | B (91%) | 0 |
| Example 9 | 18 | Yes | 0.03 | 14 | 130 | 0.4 | 0.4 | 5.2 | 5.1 | 3 | 3 | 170 | B (94%) | 2 |
| Example 10 | 15 | No | 0.10 | 7 | 420 | 0.2 | 0.2 | 5.5 | 5.8 | 3 | 3 | 190 | B (91%) | 3 |
| Comparative Example 1 | 10 | Yes | 0.34 | 3 | 1000 | 0 | 0 | 9.8 | 9.6 | 35 | 29 | 40 | C (57%) | 0 |
| Comparative Example 2 | 12 | Yes | 0.04 | 25 | 450 | 0.5 | 0.3 | 5.3 | 5.5 | 12 | 17 | 100 | C (85%) | 0 |
| Comparative Example 3 | 15 | Yes | 0.01 | 34 | 60 | 0.5 | 0.7 | 4.6 | 4.5 | 10 | 12 | 160 | C (72%) | 0 |
| Comparative Example 4 | 19 | Yes | 0.008 | 7 | 1 | 2.1 | 2.3 | 1.8 | 1.7 | 2 | 2 | 200 | C (59%) | 5 |
| Comparative Example 5 | 15 | Yes | 0.68 | 1 | 9000 | 0 | 0 | 10.2 | 10.6 | 28 | 24 | — | — | — |
| Comparative Example 6 | 15 | No | 0.43 | 2 | — | 0 | 0 | 10.4 | 10.3 | 32 | 36 | — | — | — |
| Comparative Example 7 | 12 | No | 0.26 | 1 | 2 | 0.1 | 0.1 | 5.2 | 5.6 | 3 | 2 | 200 | C (49%) | 4 |
| Comparative Example 8 | 12 | No | 0.28 | 2 | 15 | 0.2 | 0.2 | 4.5 | 4.7 | 1 | 1 | 190 | C (59%) | 6 |

INDUSTRIAL APPLICABILITY

This invention is an aromatic polyamide porous film that can be suitably used as a filter, separation membrane, battery separator, printed board, etc., especially as a battery separator capable of being used for a long period of time at high temperature.

The invention claimed is:

1. An aromatic polyamide porous film comprising an aromatic polyamide polymer having repeating units of formula (1) and/or formula (2):

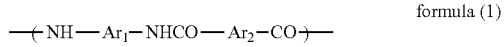  formula (1)

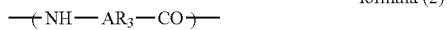  formula (2)

wherein $Ar_1$, $Ar_2$ and $Ar_3$ are aromatic rings independently selected from the group consisting of

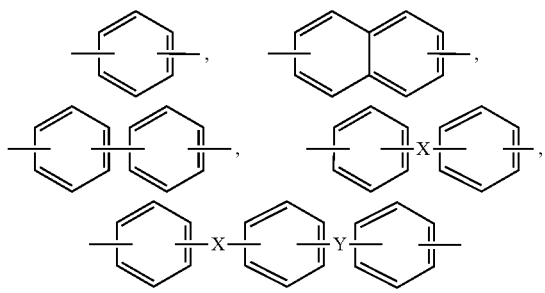

wherein X and Y are independently selected from the group consisting of —O—, —$CH_2$—, —CO—, —$CO_2$—, —S—, —$SO_2$—, and —$C(CH_3)_2$—; wherein the aromatic rings may be substituted with one or more substituents selected from the group consisting of fluoro, bromo, chloro, nitro, methyl, ethyl, propyl, methoxy, ethoxy, and propoxy groups; and wherein 80 mol % or more of the aromatic rings have a para orientation;

wherein the aromatic polyamide porous film has an Open Cell structure in which a fibrous material composed of the aromatic polyamide polymer is connected through three- or more forked intersections to form a three-dimensionally spreading network; and where use of an atomic force microscope to measure a range of S μm² at least on one surface, the sectional area S (10) μm² at a depth of 10 nm from the surface and the sectional area S (20) μm² at a depth of 20 nm from the surface results in these measured values satisfying the following formulae simultaneously:

$$0.01 \leq S(10)/S \leq 0.3$$

$$5 \leq S(20)/S(10) \leq 20,$$

2. An aromatic polyimide porous film according to claim 1, which has a Gurley Air Permeability of 5 to 500 seconds/100 cc.

3. An aromatic polyamide porous film according to claim 1, which has a heat shrinkage rate of 2% or less at 200° C. at least in one direction.

4. An aromatic polyamide porous film according to claim 1, which has a Young's modulus in tension of 3 GPa or more at least in one direction and an elongation of 5% or more.

5. An aromatic polyamide porous film according to claim 1, which has a thickness of 2 to 20 μm.

6. An aromatic polyamide porous film according to claim 1, which is used as a battery separator.

7. A secondary battery comprising the aromatic polyamide porous film as set forth in claim 1.

8. An aromatic polyamide porous film according to claim 1, wherein the aromatic polyamide polymer contains 60 mol % or more of repeating units represented by formula (3):

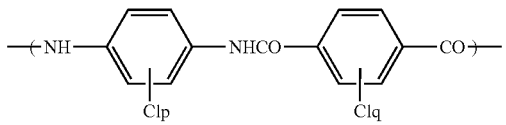

wherein p and q independently denote an integer of 0 to 4.

9. A process for producing an aromatic polyamide porous film comprising an aromatic polyamide polymer having repeating units of formula (1) and/or formula (2):

 formula (1)

 formula (2)

wherein $Ar_1$, $Ar_2$ and $Ar_3$ are aromatic rings independently selected from the group consisting of

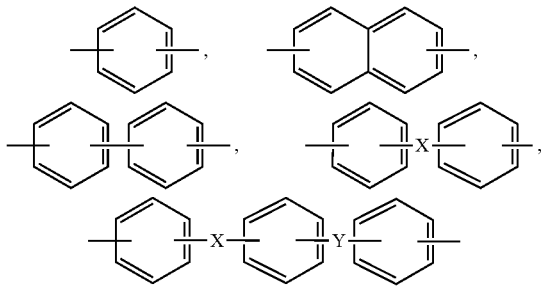

wherein X and Y are independently selected from the group consisting of —O—, —$CH_2$—, —CO—, —$CO_2$—, —S—, —$SO_2$—, and —$C(CH_3)_2$—; wherein the aromatic rings may be substituted with one or more substituents selected from the group consisting of fluoro, bromo, chloro, nitro, methyl, ethyl, propyl, methoxy, ethoxy, and propoxy groups; and wherein 80 mol % or more of the aromatic rings have a para orientation;

said process comprising the step of casting a film forming solution containing an aromatic polyamide and an organic solvent onto a support, for forming a coating, the step of cooling said coating, and the step of introducing the cooled coating into a wet bath, wherein the temperature of the support or the temperature of the atmosphere around the support onto which the film forming solution is cast is lowered to a range from −30 to 0° C., for cooling the film forming solution for a time period of 1 to 20 minutes; and the temperature difference (Ta−Tb) between the temperature of the wet bath (Ta) and the temperature of the coating not yet introduced into the wet bath (Tb) is kept at 0 to 10° C.

10. A process for producing an aromatic polyamide porous film according to claim 9, wherein the temperature difference between the temperature of the support and the temperature of the atmosphere around the support onto which the film forming solution is cast is kept within 15° C. in absolute value.

11. A process for producing an aromatic polyamide porous film according to claim 9, wherein a poor solvent for the polymer in the film forming solution or a water soluble polymer is added into the film forming solution before the film forming solution is cast onto the support.

12. A process for producing an aromatic polyamide porous film according to claim 9, wherein the aromatic polyamide polymer contains 60 mol % or more of repeating units represented by formula (3):

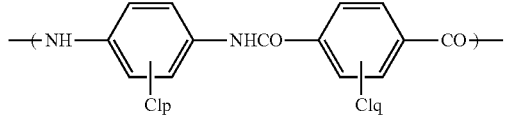

wherein p and q independently denote an integer of 0 to 4.

* * * * *